US006880398B2

(12) United States Patent
Okamoto (10) Patent No.: US 6,880,398 B2
(45) Date of Patent: Apr. 19, 2005

(54) FUEL LEVEL DETECTION DEVICE FOR A FUEL TANK

(75) Inventor: Yasuo Okamoto, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 10/277,222

(22) Filed: Oct. 18, 2002

(65) Prior Publication Data

US 2003/0074965 A1 Apr. 24, 2003

(30) Foreign Application Priority Data

Oct. 22, 2001 (JP) ........................................ 2001-323747

(51) Int. Cl.⁷ ............................................. G01F 23/32
(52) U.S. Cl. ..................... 73/317; 73/305; 73/209 R; 73/309; 73/314
(58) Field of Search ............................. 73/290 R, 305, 73/309, 314, 317, 313; 340/984

(56) References Cited

U.S. PATENT DOCUMENTS

| 5,063,381 A | 11/1991 | Ito ............................... 340/984 |
| 5,103,673 A | 4/1992 | Sawada et al. ............... 73/313 |
| 5,216,421 A | 6/1993 | Sawada et al. .............. 340/984 |
| 5,303,685 A | 4/1994 | Forgacs ....................... 123/510 |
| 5,913,294 A | 6/1999 | Takahashi et al. ..... 123/198 DB |
| 5,992,394 A | 11/1999 | Mukaidani et al. .......... 123/509 |
| 6,149,399 A * | 11/2000 | Bowser et al. ............... 417/279 |
| 6,158,368 A | 12/2000 | Nanami ...................... 114/55.5 |
| 6,176,133 B1 | 1/2001 | Hutter et al. ................. 73/306 |
| 6,253,790 B1 | 7/2001 | Hara ...................... 137/565.17 |
| 6,276,201 B1 | 8/2001 | Gette et al. ................... 73/317 |
| 6,298,540 B1 | 10/2001 | Benjey et al. ................ 29/452 |

FOREIGN PATENT DOCUMENTS

| DE | 19615317 | 10/1996 |
| EP | 761959 | 3/1997 |

OTHER PUBLICATIONS

European Patent Office Search Report, Jan. 30, 2003.

* cited by examiner

Primary Examiner—Hezron Williams
Assistant Examiner—Rodney T. Frank
(74) Attorney, Agent, or Firm—Knobbe, Martens, Olson & Bear LLP (57) ABSTRACT

A fuel level detection device detects the level of fuel in the fuel tank. The fuel level detection device comprises a body including at least one mounting station and a fuel level detection unit. The fuel level detection unit includes a base and a float mounted relative to the base so as to have varying position relative to the base depending on the level of fuel in the fuel tank. The fuel level detection unit further contains a link coupling the float to the base and a sensor producing a signal indicative of the position of the float within the fuel tank. The fuel level detection unit is capable of being disposed at more than one position on the body.

23 Claims, 7 Drawing Sheets

FUEL LEVEL DETECTION DEVICE FOR A FUEL TANK

RELATED APPLICATION

The present application is based on and claims priority under 35 U.S.C. §119 to Japanese Patent Application No. 2001-323747, filed Oct. 22, 2001, the disclosure of which is hereby incorporated by reference in its entirety.

BACKGROUND OF THE INVENTION

1. Field of the Invention

The present invention relates to a fuel level detection device and, more particularly, to a fuel level detection device capable of being mounted in fuel tanks having a variety of shapes.

2. Description of the Related Art

Space and aerodynamic considerations affect the design of scooter-type motorcycles and their subsystems. For instance, the fuel tank may have a relatively complex shape so as to simultaneously meet aerodynamic constraints, maximize fuel tank capacity, accommodate a compact system envelope, and allow for a large volume of an adjacent storage box. Also, because a large number of components are contained within a relatively small envelope, location and orientation options are limited for components such as a fuel pump. In particular, the discharge opening of the fuel pump must be oriented to provide easy access for connection to the fuel supply hose used to transfer fuel from the fuel tank to fuel injectors or other charge formers.

Fuel level detection devices are used to indicate the amount of fuel contained in the fuel tank. A common method for measuring fuel level is through the use of a float that is coupled to a base of the device via a link in the form of an arm or rod. As the level of fuel within the fuel tank changes, buoyancy causes the float move, which in turn causes the link to rotate. A sensor, such as a potentiometer, generates a variable voltage signal depending on the angular orientation of the link, thus providing an indication of the amount of fuel inside the fuel tank.

SUMMARY OF THE INVENTION

An aspect of the present invention involves a fuel level detection device that allows detection of the fuel level with a variety of fuel tank shapes and sizes. The fuel level detection device may be integrated with the fuel pump to simplify assembly into the fuel tank. The versatility of the fuel level detection device offers a benefit to manufacturers. First, since different shapes of fuel tanks are used with various models of a motor vehicle, components that are interchangeable between fuel tanks and models offer manufacturers a way to reduce costs. Second, the float of the fuel level detection device is capable of being disposed within the fuel tank so as to meet the requirement that the discharge opening of the fuel pump be oriented to provide easy access for connection of the fuel supply hose. Thus, the invention can be easily positioned within a wide variety of fuel tanks so as to provide an accurate indication of the fuel level for a variety of fuel tank shapes and sizes.

Thus, in accordance with one aspect of the present invention, a device for detecting the level of fuel in a fuel tank is provided. The device comprises a body and a fuel level detection unit. The body is configured to be disposed within a fuel tank and defines a plurality of mounting stations. The fuel level detection unit is capable of being selectively mounted to one of the mounting stations. The fuel level detection unit includes a base, a float disposed relative to the base, and a link that couples the float to the base. In this manner the position of the float can vary relative to the base depending on a level of fuel in the fuel tank. A sensor of the unit detects the position of the float and produces a signal indicative of the position of the float relative to the base.

Another aspect of the present invention involves fluid level detection device for detecting the level of fluid in a container where the container housing a support structure. The fluid level detection device comprises at least one mounting station capable of being movably coupled to the support structure within the container and a fluid level detection unit. The fuel level detection unit includes a base, a float disposed relative to the base within the container, a link coupling the float to the base so as to have varying positions relative to the base depending on the level of liquid in the container. The base cooperates with the mounting station to attach the fuel level detection unit to the support structure. A sensor of the unit is arranged to produce a signal indicative of the position of the float within the container.

An additional aspect of the present invention involves a fuel tank comprising a container with an opening on an upper side of the container and a fuel level detection device. The device includes a body that is configured to be inserted into the container through the upper opening and a fuel level detection unit. The fuel level detection unit has a base that is movably coupled to the body, a float, and a link that couples the float to the base. The detection unit also includes a sensor that is arranged to produce a signal indicative of the position of the float in the tank.

BRIEF DESCRIPTION OF THE DRAWINGS

The foregoing features, aspects, and advantages of the present invention will now be described with reference to the drawings of preferred embodiments that are intended to illustrate and not to limit the invention. The drawings comprise seven figures.

DETAILED DESCRIPTION OF THE PREFERRED EMBODIMENT

Figure 1:
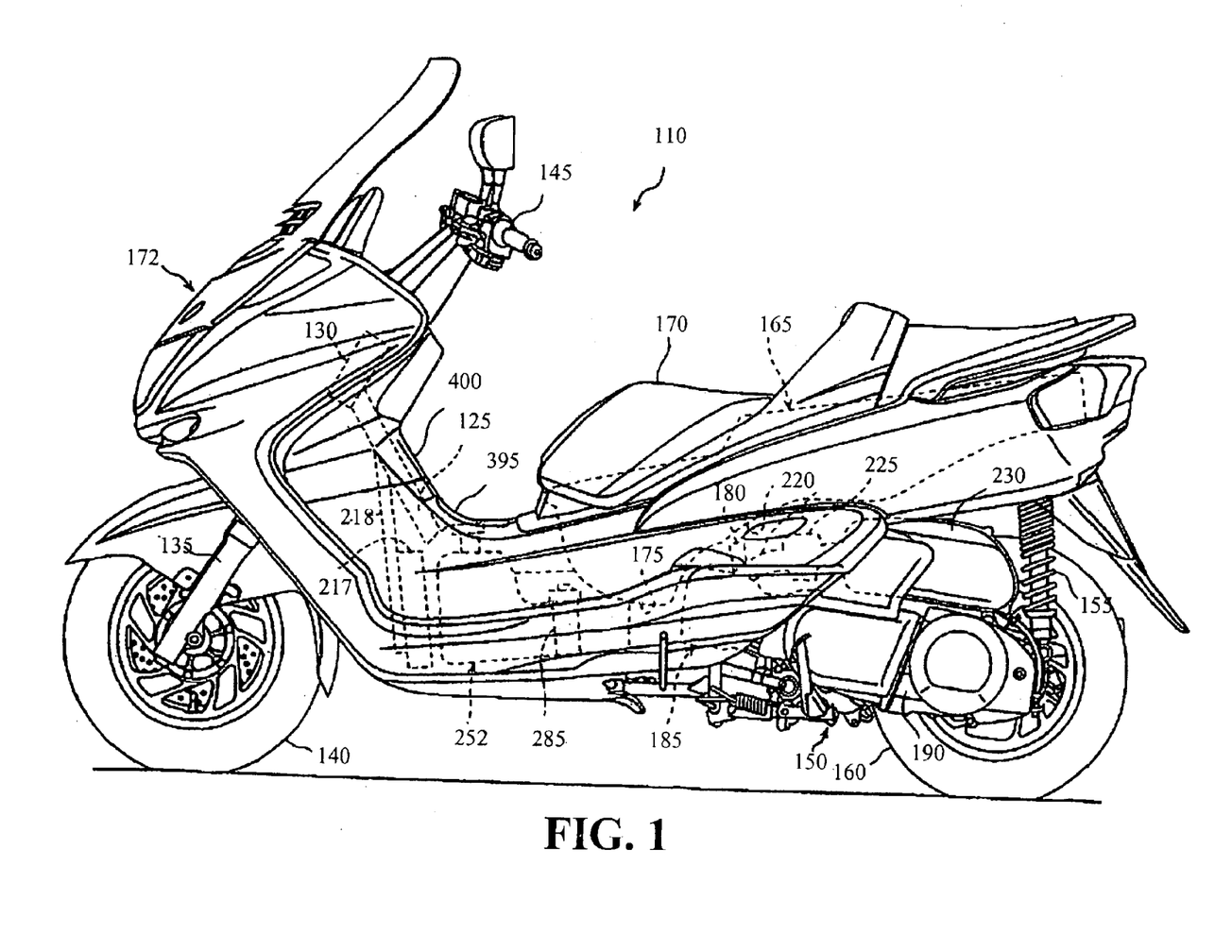
FIG. 1 is a left-side view of a scooter-type motorcycle to which a preferred embodiment of the present invention is applied.
Figure 2:
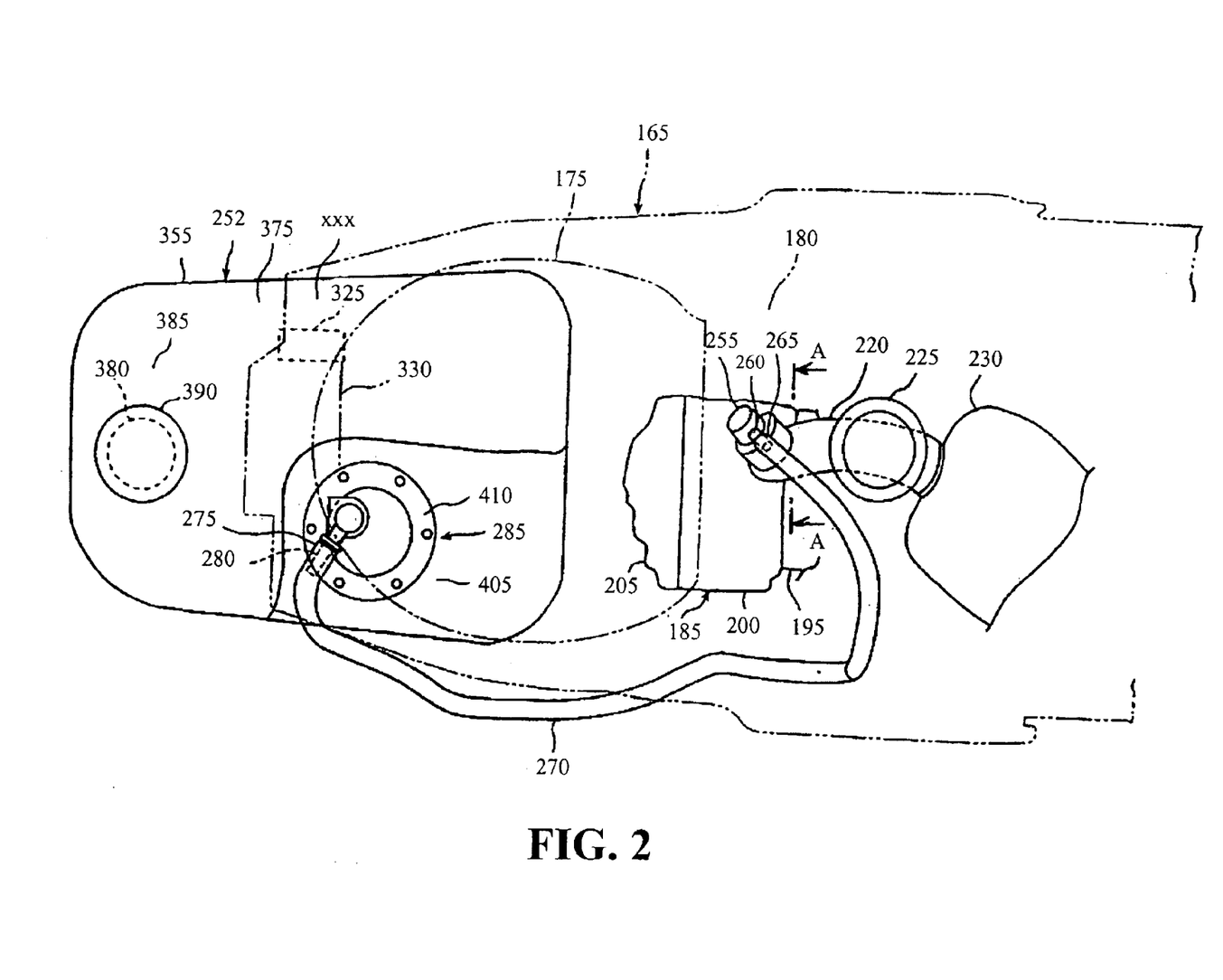
FIG. 2 is a top view of the scooter-type motorcycle shown in FIG. 1 illustrating the layout of the fuel system.
Figure 3:
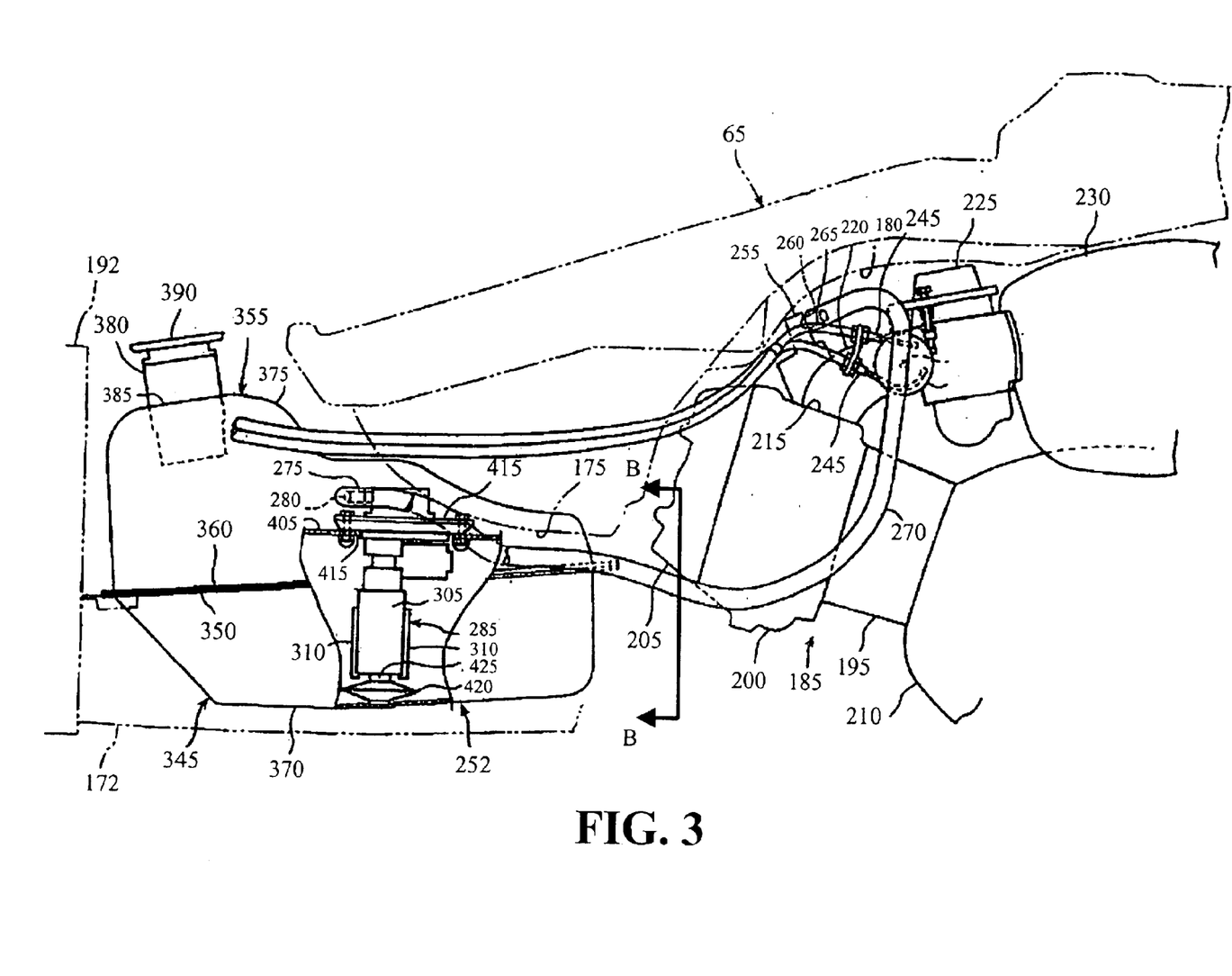
FIG. 3 is an enlarged left-side view of the scooter-type motorcycle in FIG. 1 illustrating the layout of the fuel system.

FIGS. 1–3 illustrate the overall construction of a scooter-type motorcycle 110 employing a fuel level detection device 120 configured in accordance with a preferred embodiment of the present invention. The use of a scooter-type motorcycle shown in these figures illustrates a typical application of the present invention and should not be construed as limiting. For instance, the fuel level detection device 120 may also be advantageously used in conjunction with other devices powered by liquid fuels such as, for example, but without limitation, motorcycles, ATVs, lawn mowers, snowmobiles, boats, and personal watercrafts. In other applications, the present fuel level detection device 120 may be used to measure the levels any liquid stored in a container.

The fuel level detection device 120 is schematically illustrated FIGS. 4–6 and will be discussed in detail below, following a description of the scooter-type motorcycle. In the following description, the terms "front," "rear," "left," and "right" are used to describe the motorcycle 110 and its various components as viewed by a rider seated in a normal riding position.

FIG. 1 schematically illustrates a view of the left side of the motorcycle 110, which comprises a body frame 125 having a head pipe 130, which steerably supports a front fork 135. The front forks 135 supports a front wheel 140 at the lower end thereof and handlebars 145 at the upper end thereof. A unitary swing-type engine unit 150 is located at the rear of the body frame 125 and is oscillatory and pivotally supported at approximately the midsection of the body frame 125. The engine unit 150 is additionally supported by a rear wheel suspension system 155 linking a rear wheel 160 to the rear of the body frame 125. A storage box 165 is disposed above the engine unit 150 such that the storage box 165 may be opened and closed by raising and lowering a seat 170. For this purpose, the seat is coupled to the frame 125 by a hinge. The seat 170 of course serves to support the operator (i.e., rider) when in its lowered position. In certain embodiments, a body cover 172 encloses most of the parts of the motorcycle 110, other than the front wheel 140 and the rear wheel 160. In particular, the body cover 172 encloses the forward section of the handlebars 145, peripheries of the body frame 125, the forward section of the engine unit 150, and the storage box 165.

The storage box 165 is disposed generally at the upper portion of the body frame 125, extending from the midsection to the rear of the body frame 125. The storage box 165 includes a forward section 175 having a bottom that is generally arc-shaped protruding downward. The forward section 175 is sufficiently deep and wide to accommodate storage of a protective helmet. When viewed from above, as in FIG. 2, the depth of the forward section 175 in regions near the center of the storage box 165 is greater than the depth in the regions to the left and right of the center. The storage box 165 additionally comprises a midsection 180 having a bottom that is generally arc-shaped in the upward direction. The depth of the midsection 180 is smaller than that of the forward section 175. When viewed from the side, the bottom of the midsection 180 has a radius of curvature that is larger than the radius of curvature of bottom of the forward section 175.

In the illustrated embodiment, the engine unit 150 comprises a water-cooled, four-stroke, single cylinder engine body 185 and a transmission case 190 housing a V-belt stepless shifting transmission mechanism (i.e., a continuously-variable transmission (CVT) in combination with a change-speed transmission). The transmission case 190 is supported by the rear wheel suspension system 155, which links the rear wheel 160 to the rear of the body frame 125. The rear wheel 160 is pivotally supported at the rear of the transmission case 190.

As seen in FIGS. 1 and 3, the engine body 185 is positioned below the midsection 180 of the storage box 165 and is formed by a cylinder body 195, a cylinder head 200, a head cover 205 and a crankcase 210. This assembly extends in generally a horizontal direction. An opening 215 of an intake passage (not shown) within the cylinder head is disposed on the top face of the cylinder head 200.

An intake manifold 220, that is connected to the intake passage opening 215, extends rearward below the midsection 180 of the storage box 165 to connect to a throttle body 225. The throttle body 225 in turn is connected to an air cleaner 230 or plenum chamber. The air cleaner 230 is placed above and is fixed to the transmission case 190.

A throttle pulley 235 is fixedly mounted to the left end of a valve axis 240 of a butterfly-type throttle valve disposed within the throttle body 225. Two throttle cables 245, 250 looped around the throttle pulley 235 are connected to throttle grips of the handlebars 145.

A radiator 217, which provides cooling for the engine unit 150, is disposed between a set of down tubes 218 that are located at the lower half of the front of the body frame 125. The radiator 217 is oriented in an upright position in the generally vertical direction.

Figure 7:
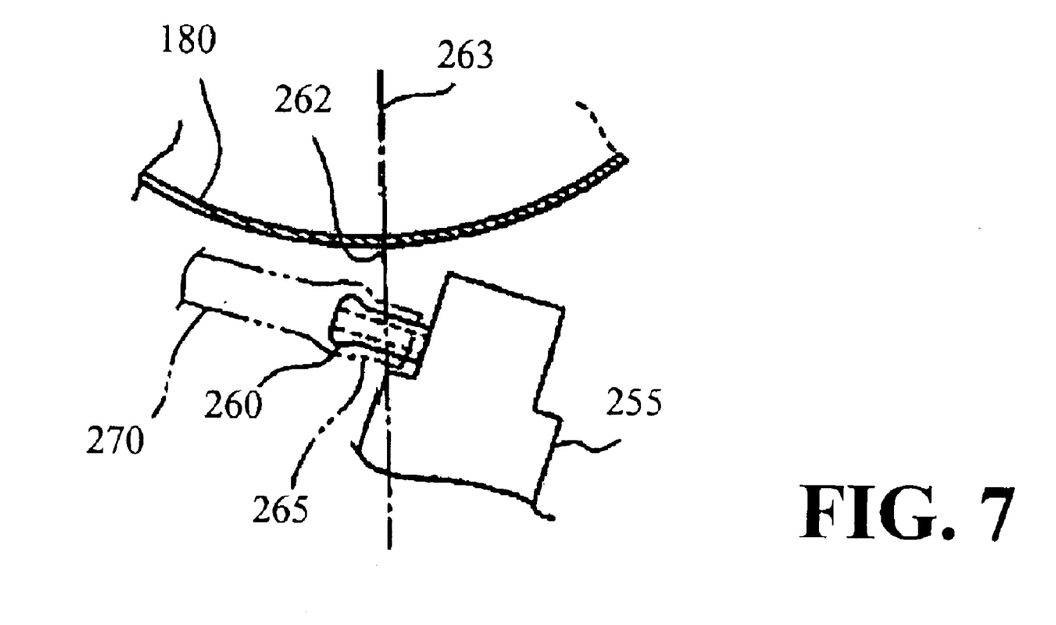
FIG. 7 is a view, as seen in direction of arrows A—A in FIG. 2, that illustrates the arrangement of the fuel injector relative to the bottom of the mid-section of the storage box the scooter-type motorcycle shown in FIG. 1.

The various components of the motorcycle 110 are disposed so as to provide sufficient space for a fuel tank 252 and the storage box 165, as well as to provide for a sufficiently low seat level. For example, as illustrated in FIGS. 3 and 7, a fuel injector 255 is mounted in the vicinity of where the intake manifold 220 connects to the cylinder head 200. The fuel injector 255 is positioned to one side (i.e., the right side) of the lowest end 262 (FIG. 7) at the bottom of the midsection 180 of the storage box 165. The fuel injector is inclined rightward and forward relative to the vertical line 263. Also, a fuel supply opening 260 of the fuel injector 255 is directed rearward and leftward of the vehicle and a downstream end 265 of a fuel supply hose 270 is fixedly connected to said fuel supply opening 260.

Additionally, as seen in FIG. 2, the fuel supply hose 270 extends leftward on the vehicle from the fuel injector 255 through a space existing between the intake manifold 220 and the bottom of the midsection 180. The fuel supply hose 270 then extends forward, running along the left side of the engine body 185 to allow an upstream end 275 thereof to be connected to a discharge opening 280 of a fuel pump 285. The fuel pump 285 is inserted and placed into the fuel tank 252. The fuel tank 252 is positioned forward of the engine body 185 and placed so as to allow its rear-half section to be positioned below the forward section 175 of the storage box 165.

In the illustrated embodiment, the fuel pump 285, which is housed within the fuel tank 252, is disposed towards the left side and forward of the lowest end of the storage box forward section 175. The fuel tank 252 is mounted such that its rear-half section is positioned below the bottom of the forward section 175 of the storage box 165, thereby maximizing the capacity of the fuel tank 252 given space constraints. Also, the discharge opening 280 of the fuel pump 285 is directed outward in a forward-left direction. The shape and layout of the components described above contribute to increasing the capacity of the storage box 165 and the fuel tank 252, as well as provide easier access for routing hosing and connecting the fuel supply hose 270 to the discharge opening 280.

Figure 4:
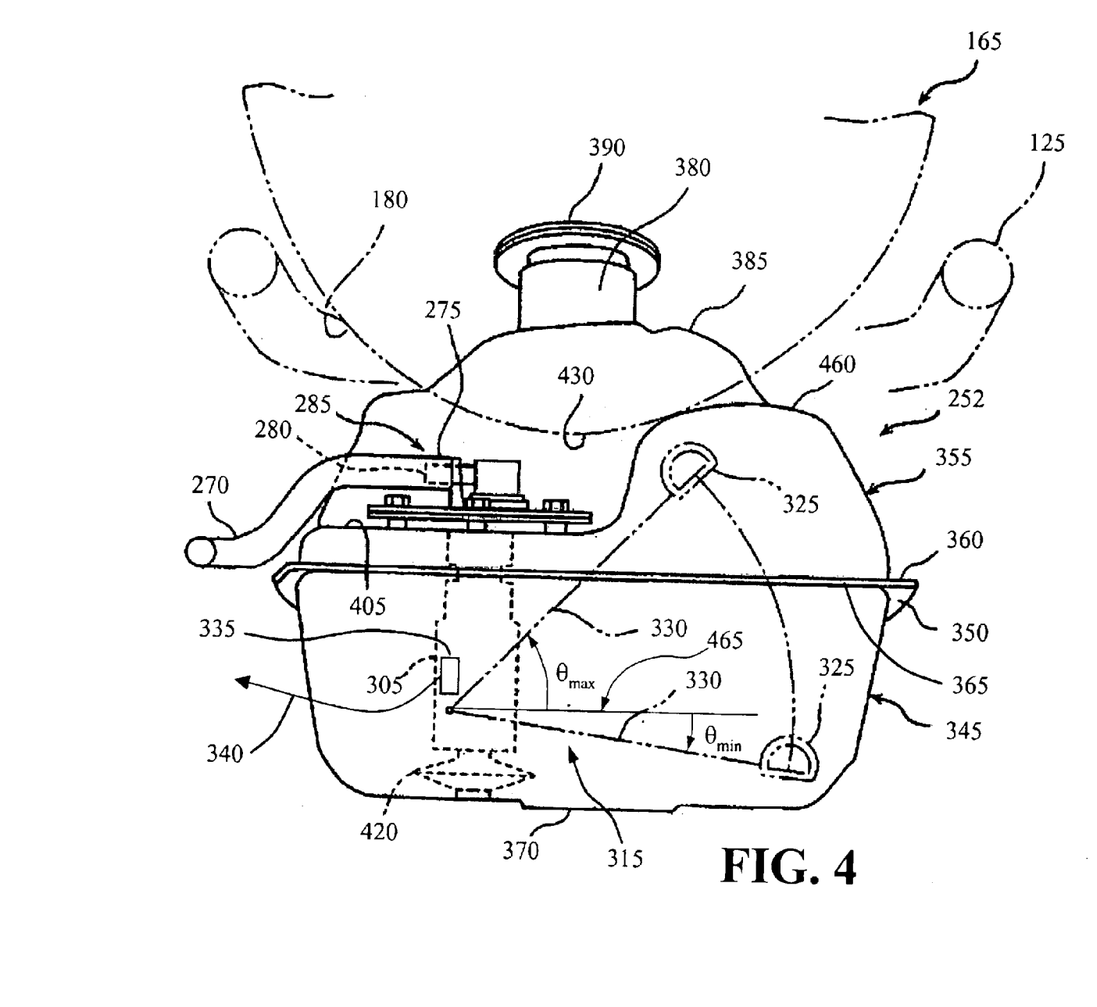
FIG. 4 is a view as seen in direction of arrows B—B in FIG. 3 illustrating a preferred embodiment of the fuel level detection device mounted inside a fuel tank.
Figure 5:
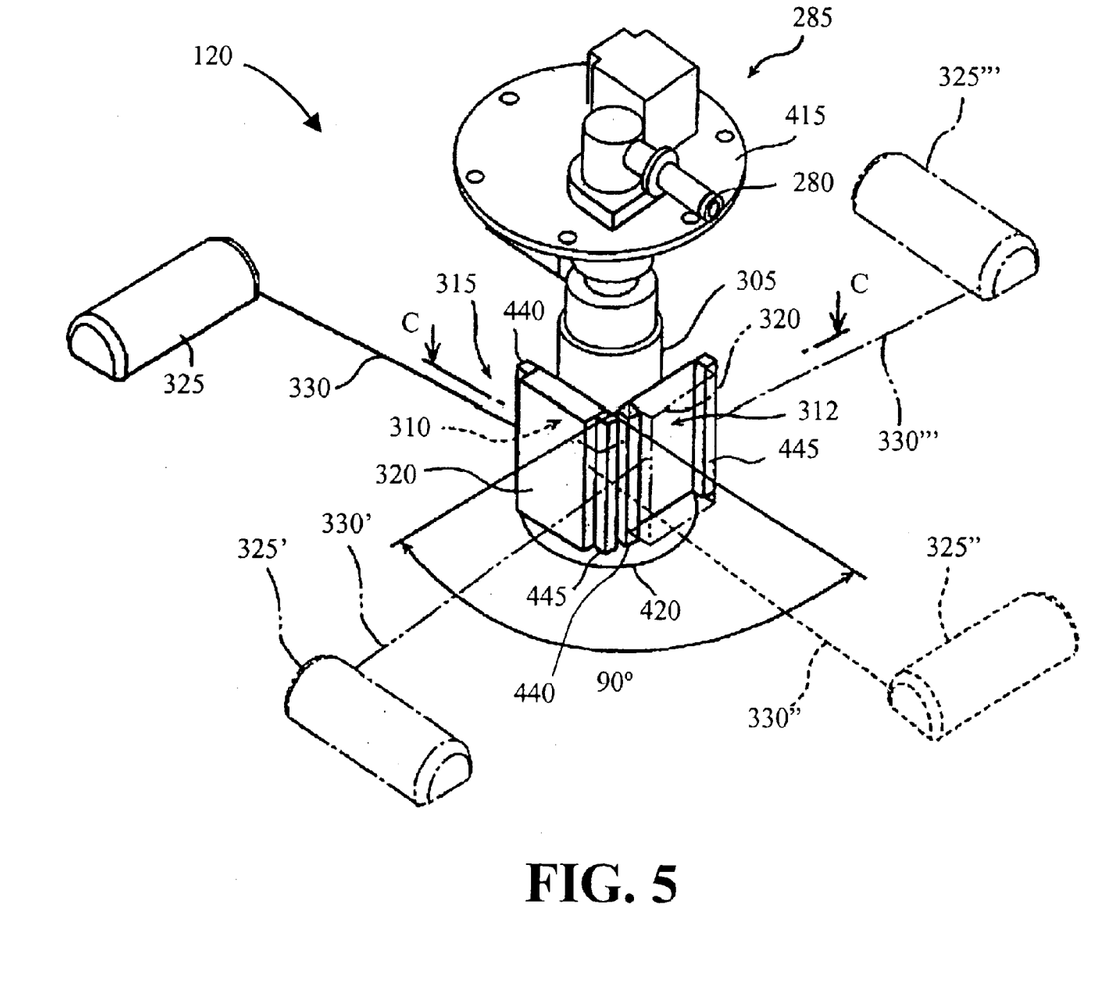
FIG. 5 is a perspective view the fuel level detection device.
Figure 6:
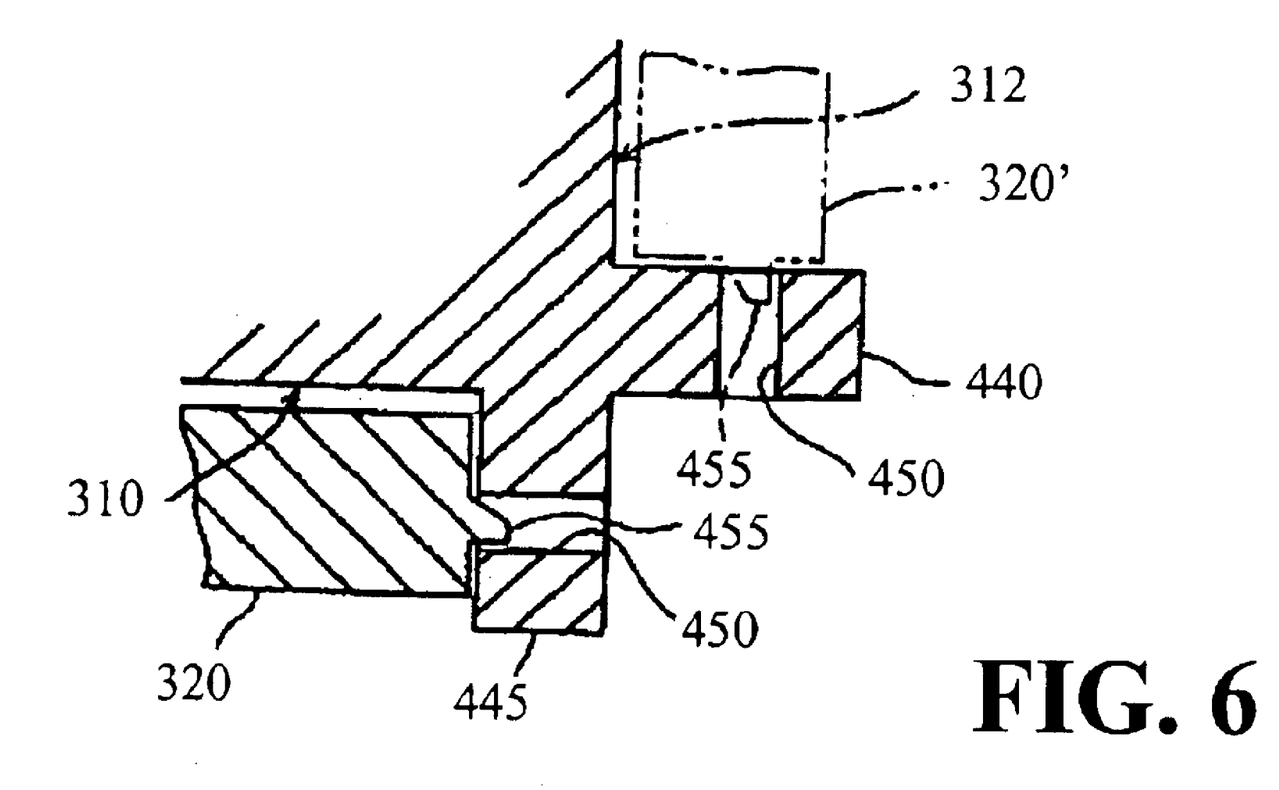
FIG. 6 is a partial cross-sectional view as seen in direction of arrows C—C in FIG. 5 illustrating features of the mounting stations and bases of a fuel level detection device.

In a preferred embodiment that is best illustrated in FIGS. 4–6, the fuel level detection device 120 detects the level of fuel in the fuel tank 252. The fuel level detection device 120 comprises a body 305 including at least one and preferably a plurality of mounting stations 310, 312 and a fuel level detection unit 315. In the present embodiment, the body 305 includes two mounting stations; however, additional mounting stations can be used. The fuel level detection unit 315 includes a base 320 and a float 325 coupled to the base 320 so as to have varying position relative to the base 320 depending on the level of fuel in the fuel tank 252. The fuel level detection unit 315 further includes a link 330 that couples the float 325 to the base 320 and a sensor 335 that produces a signal 340 indicative of the position of the float 325 within the fuel tank. The fuel level detection unit 315 is capable of attaching at more than one mounting station. Accordingly, "unit" as used in the present context (i.e., "fuel level detection unit") means a subsystem of the fuel level detection device 120 as opposed to a single component of the device.

The float 325 can comprise a material that has a specific gravity that is less than the specific gravity of the fuel contained in the fuel tank 252. The float 325 can also or alternatively form a hollowed and sealed volume having an effective specific gravity that is less than the specific gravity of the fuel contained in the fuel tank 252. The float 325 preferably is made of a material that is impermeable and non-reactive to the fuel contained in the fuel tank 252. The float 325 that is illustrated in FIG. 5 is an elongated, semi-cylindrical body; however, other shapes, such as, for example, spherical or ellipsoidal, can also be used.

The position of the float 325 is converted by the link 330 into a suitable input parameter detected by the sensor 335. In the illustrated embodiment, as shown in FIGS. 4 and 5, the link 330 is a stiff rod and the input parameter detected by the sensor 335 is the angular orientation link 330; however, other combinations are possible. For example, the link 330 can be a flexible tether or spring that stretches or contracts in accordance with the liquid level in the fuel tank 252. The link in this case converts the vertical position of the float 325 into a force that is detected by a detector, such as a strain gauge. Other configurations are possible and those skilled in the art will be able to choose suitable combinations of the float 325, the link 330, and the sensor 335 consistent with the present invention, such that the position of the float 325 can be detected by the sensor 335 (e.g., by using the link to convert the position of the float into a suitable input parameter).

In the illustrated embodiment, the fuel tank 252 has a generally trapezoidal shape when viewed from above, as seen in FIG. 2. The fuel tank 252 comprises a lower-half 345 with a flange 350 and an upper-half 355 with a flange 360. The lower-half 345 and the upper-half 355 are made of sheet metal and jointed together at a seam 365. The flanges 350, 360 are welded together along the seam 365 to form a sealed container. Of course, the fuel tank 252 can have other shapes, can be made of other material, and can be formed by other processes known to those skilled in the art.

The fuel tank 252 additionally comprises a bottom surface 370 that is substantially flat and a top surface 375 that is shaped with a greater height toward its forward section. The top surface 375 is shaped so as to provide a relatively large fuel tank capacity while avoiding contact with the forward section 175 of the storage box 165. The fuel tank 252 further comprises a filler pipe 380 projecting from a front protrusion 385 at the highest position of the top surface 375. A filler cap 390 is detachably coupled to the top of filler pipe 380. Access to the filler cap 390 is gained via a lid 395 located in a footboard area 400 of the body cover 72 (see FIG. 1).

The top surface 375 of the fuel tank 252 additionally comprises a substantially flat stepped-surface 405 located on the left side of the rear-half thereof that is lower than the rest of the top surface 375. The stepped-surface 405 comprises an opening for receiving the fuel pump 285 and mounting holes 415 for attaching the fuel pump 285 to the fuel tank 252. The fuel pump 285 comprises a flange 410 for attaching the pump 285 at the mounting holes 415 of the stepped-surface 405. As best seen in FIG. 3, the pump body 305 includes a filter 420 mounted to an inlet opening 425 at the lower end of the pump body 305.

The discharge opening 280 located at the top of the pump body 305 faces slightly aslant of the forward direction toward the left so as to prevent contact with the downward protrusion of the forward section 175 of the storage box 165. As seen most clearly in FIG. 4, contact is prevented with the bottom 430 of the forward section 175 of the storage box 165 by orientating the discharge opening 280 leftward.

In certain embodiments, the mounting stations 310, 312 are made of a resin material and are mechanically attached to the pump body 305 using bolts or clamps. In other embodiments, the mounting stations 310, 312 are fused to the pump body 305 using a welding, soldering, or similar process. In yet other embodiments, the mounting stations 310, 312 and the pump body 305 are cast together to form an integral part. In the illustrated embodiment, each of the mounting stations 310, 312 comprise left and right mounting rails 440, 445, which are formed to match the horizontal width of the base 320. Each of the mounting rails 440, 445 contains an engaging groove 450 in the form of a slot, as best illustrated in FIG. 6.

In the illustrated embodiment, as seen in FIG. 5, the mounting stations 310, 312 are disposed at substantially a right angle to each other to provide four possible locations of the float 325. In other embodiments, additional mounting stations are provided to increase the number of available positions for locating the float 325. In yet other embodiments, the fuel level detection device 120 comprises at least one mounting station 310 that is movably relative to (e.g., detachably coupled to) the pump body 305.

In certain embodiments, the fuel level detection unit 315 is substantially made of a metal, while in other embodiments, the fuel level detection unit 315 is substantially made of a resin material. Other materials may also be used that have favorable mechanical and chemical resistance properties. In the illustrated embodiment, as best seen in FIG. 6, the base 320 comprises two engaging tabs 455 projected from the left and right edge faces of the base 320 that are disposed so as to be insertable into the engaging grooves 450 of the mounting rails 440, 445.

The sensor 335 detects the location of the float 325 and produces the signal 340 that is indicative of the level of fuel in the fuel tank 252. In certain embodiments, the sensor 335 is a potentiometer that generates a variable voltage signal depending on the angular orientation of the link 330. In other embodiments, the sensor 335 generates a variable signal depending on the position of the float relative to the base 320.

For the illustrated embodiment, the pump body 305 and the mounting stations 310, 312 preferably are fused or cast together, and the assembly of the fluid level detection device 120 involves the following procedure. First, the base 320 of the fluid level detection unit 315 is detachably mounted to one of the mounting stations 310, 312. The selection of which mounting station depends upon the desired orientation of the float 325 relative to the fuel pump discharge 280. The float 325 desirably is oriented such that the float 325 will have a large range of motion in the fuel tank when the assembly is completed. In other words, the range of motion of the float will correspond to when the tank is full and when it is empty. As best seen with reference to FIG. 6, the fuel level detection unit 315 is selectably and detachably mounted to one of the mounting stations 310, 312 by press-fitting the engaging tabs 455, which are located on opposite edge faces of the base 320, into the engaging grooves 450 of the mounting rails 440, 445. This arrangement provides for easy mounting and removal of the fuel level detection unit 315. To remove the fuel level detection unit 315, a flat-blade screwdriver, or a similar tool, is inserted into the space between the base 320 and the mounting stations 310, 312, which releases the engaging tabs 455 from the engaging grooves 450.

Once the fuel level detection unit 315 is mounted to the pump body 305, the entire assembly can be inserted and positioned inside the fuel tank 252. The float is first inserted through the opening on the stepped-surface 405 of the fuel tank 252. The fuel pump 285 is then secured to the fuel tank 252 using bolts that are fastened to the mounting holes 415 on the stepped-surface 405 of the fuel tank 252. However, in other application, the pump body 305 can be first mounted to the fuel tank 252 and then the fuel level detection unit 315 can be mounted to the pump body 305 using the method outlined above herein.

The operation of the fuel level detection device 120 is best illustrated by reference to FIGS. 4 and 5. FIG. 4 schematically illustrates the fuel level detection device 120 and the fuel pump 285 disposed within the fuel tank 252. The fuel level detection unit 315 is attached to the pump body 305 via one of the mounting stations 310, 312 as described above.

An advantage of the fuel level detection device 120 is that the same device provides an accurate measure of the fuel level for a variety of fuel tank shapes and sizes, since the float 325 is easily disposed to a location wherein the float 325 has a large range of vertical motion within the fuel tank 252. For example, referring to the solid line portions of FIG. 5, the base 320 is mounted to the first mounting station 310 so that the float 325 is located as shown in the top-left corner. This orientation of the fuel level detection unit 315 corresponds to that shown by the phantom lines in FIG. 4, where the float 325 is seen to sweep through a relatively wide range of the vertical positions within the fuel tank 252 and, more specifically, may occupy a relatively higher part 460 of the fuel tank 252. Thus, the float 325 provides an accurate measure the fuel level even when the fuel tank 252 is full of fuel and when it is empty.

In certain embodiments, the fuel level detection device 120 operates in the following manner. When the fuel tank 252 is empty, the float 325 is located at or near the bottom of the fuel tank 252 and the link 330 has an angular position θmin relative to a horizontal line 465. The sensor 335 senses the angular position of the link 330 and produces a signal 340 having a value of Vmin, indicating that the fuel tank 252 is empty. When fuel is added to the fuel tank 252, buoyancy forces cause the float 325, which has a lower specific gravity than the fuel, to move vertically. The vertical movement of the float 325 causes the link 330 to rotate and the signal 340 from the sensor 335 to change in a way that is indicative of the fuel level. When the fuel tank 252 is completely filled with fuel, the link 330 attains the angular position θmax relative to a horizontal line 465 and the sensor 335 produces a signal 340 having a value of Vmax, indicating that the fuel tank 252 is full. Of course, the sensor 335 can be calibrated without reference to when the link 330 assumes a horizontal position.

In the preferred embodiment, the fuel level detection device 120 is disposed inside the fuel tank 252 so as to allow the float 325 to have a large range of vertical motion within the fuel tank 252. For a fuel tank having a shape different from that of fuel tank 252 shown in FIGS. 2–4, the base 320 is selectably and detachably mounted to one of the mounting stations 310, 312, so that the float 320 produces a range of vertical motion that corresponds to when the tank is full and when it is empty. Thus, the fuel level detection device 120 allows the float 325 to be disposed within the fuel tank 252 such that the fuel level is accurately detected for a wide variety of fuel tank shapes and sizes.

For example, as schematically illustrated in FIG. 5, the base 320 of the fuel level detection unit 315 can be mounted to another mounting station 312, represented by the float 325' and the link 330'. This orientation is rotated approximately 90 degrees relative to the position described above and is shown by the phantom lines in FIG. 5. Thus, the float 325 is able to rotate about either of two different axes that are substantially perpendicular to each other. Two additional orientations are possible either by rotating the fuel level detection unit 315 by 180 degrees about a vertical axis or by changing the position of the link 330 to the other side of the base 320. These orientations are represented in FIG. 5 by the dotted lines illustrating the float 325" and the link 330" and by the dashed lines illustrating the float 325'" and the link 330'".

Although this invention has been disclosed in the context of a certain preferred embodiment and variations thereof, it will be understood by those skilled in the art that the present invention extends beyond the specifically disclosed embodiments to other alternative embodiments and/or uses of the invention and obvious modifications and equivalents thereof. For example, the fuel level detection device can comprise three or more mounting stations in order to increase the number of possible mounting stations of the fuel level detection unit. The fuel level detection device can also employ one or mounting stations that move relative to the pump body. In such an embodiment, the mounting station(s) forms a single unit and further comprises a coupling mechanism, such as a band, that wraps around the pump body and a fastener that tightens the band about the pump body.

In addition, while a number of variations of the invention have been shown and described in detail, other modifications, which are within the scope of this invention, will be readily apparent to those of skill in the art based upon this disclosure. It is also contemplated that various combination or sub-combinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A device for detecting the level of fuel in a fuel tank, comprising a body being configured to be disposed within a fuel tank and defining a plurality of mounting stations, which mounting stations comprise mounting rails having engaging grooves defined therein, and a fuel level detection unit capable of being selectively mounted to one of the mounting stations, the fuel level detection unit including a base, engaging tabs configured to engage the engaging grooves, a float disposed relative to the base, a link coupling the float to the base so as to have varying positions relative to the base depending on a level of fuel in the fuel tank, and a sensor producing a signal indicative of the position of the float relative to the base.

2. The device of claim 1, wherein the fuel level detection unit is removeably mounted to one of the mounting stations.

3. The device of claim 1, wherein the link comprises an arm that pivots relative to the base as the position of the float changes.

4. The device of claim 3, wherein the sensor is arranged to sense an angular orientation of the arm relative to the base.

5. The device of claim 1, wherein at least two of the mounting stations are disposed on the body generally at a right angle to each other.

6. The device of claim 1, wherein the body forms at least a portion of a fuel pump.

7. The device of claim 1, wherein the body is configured to be disposed within a fuel tank to assume a generally vertical orientation.

8. The device of claim 1, wherein the mounting stations are mechanically attached to the body.

9. The device of claim 1, wherein the mounting stations and the body form an integral part.

10. The device of claim 1, wherein the mounting stations are detachably coupled to the body.

11. A device for detecting the level of fuel in a fuel tank comprising a body defining a plurality of mounting stations, which mounting stations comprise mounting rails having engaging grooves defined therein, a float, a link coupling the float to the body, a sensor producing a signal indicative of the position of the float relative to the body, and engaging tabs configured to engage the engaging grooves for selectively connecting the link to the body.

12. The device of claim 11, wherein sensor is connected to the body.

13. The device of claim 12, wherein the link comprises an arm that pivots relative to the body as the position of the float changes.

14. The device of claim 13, wherein the sensor is arranged to sense an angular orientation of the arm relative to the body.

15. A fuel tank comprising a container with an opening on an upper side of the container and a fuel level detection device comprising a body configured to be inserted into the container through the upper opening, said body defining a plurality of mounting stations, which mounting stations comprise mounting rails having engaging grooves defined therein, and a fuel level detection unit, the fuel level detection unit including a base that is movably coupled to the body by means of engaging tabs configured to engage the engaging grooves, a float, a link that couples the float to the base, and a sensor arranged to produce a signal indicative of the position of the float in the tank.

16. The fuel tank of claim 15, wherein the base includes a plurality of mounting stations, and each mounting station is configured to cooperate with the base of the fuel level detection unit so as to detachably connect the base to the body.

17. The fuel tank of claim 16, wherein the at least two mounting stations are arranged at a right angle relative to each other.

18. The fuel tank of claim 15, wherein the link comprises an arm that pivots relative to the base as the position of the float changes within the fuel tank.

19. The fuel tank of claim 18, wherein the sensor is arranged to sense an angular orientation of the arm relative to the base.

20. The fuel tank of claim 15, wherein the body forms at least a portion of a fuel pump.

21. The fuel tank of claim 20, wherein the body is configured to be disposed within a fuel tank to assume a generally vertical orientation.

22. A fluid level detection device for detecting the level of fluid in a container, the container housing a support structure, the fluid level detection device comprising at least one mounting station capable of being movably coupled to the support structure within the container at any circumferential position and a fluid level detection unit including a base, a float disposed relative to the base within the container, a link coupling the float to the base so as to have varying positions relative to the base depending on the level of liquid in the container, and a sensor producing a signal indicative of the position of the float within the container, the base cooperating with the mounting station to attach the fuel level detection unit to the support structure.

23. The fluid level detection device of claim 22, wherein the link comprises an arm.

* * * * *

UNITED STATES PATENT AND TRADEMARK OFFICE
CERTIFICATE OF CORRECTION

PATENT NO. : 6,880,398 B2
DATED : April 19, 2005
INVENTOR(S) : Yasuo Okamoto

It is certified that error appears in the above-identified patent and that said Letters Patent is hereby corrected as shown below:

<u>Column 8,</u>
Line 67, delete "," and insert -- sufficiently to secure the fuel level detection unit in each of the plurality of mounting stations during operation without the need for an additional fastener --.

<u>Column 9,</u>
Line 31, delete "body" and insert -- a detection unit configured to be mountable to each of the plurality of mounting positions, the detection unit including --.
Lines 32-34, delete "and engaging tabs configured to engage the engaging grooves for selectively connecting the link to the body" and insert -- the detection unit also being configured to allow the link to be attached to the unit in a plurality of different places --.

<u>Column 10,</u>
Lines 2-4, after "station," delete "which mounting stations comprise mounting rails having engaging grooves defined therein,".
Lines 6-7, after "body," delete "by means of engaging tabs configured to engage the engaging grooves".
Line 8, after "arranged," insert -- in the base and --.
Line 9, after "tank," delete "." and insert -- , the link being connectable to the base sensor in at least two different places --.

Signed and Sealed this

Twenty-fifth Day of April, 2006

JON W. DUDAS
*Director of the United States Patent and Trademark Office*